Jan. 5, 1954 K. W. W. HIGH 2,664,940
CONVERTIBLE, ADJUSTABLE, AND COLLAPSIBLE SEAT AND LADDER
Filed June 15, 1951 3 Sheets-Sheet 3

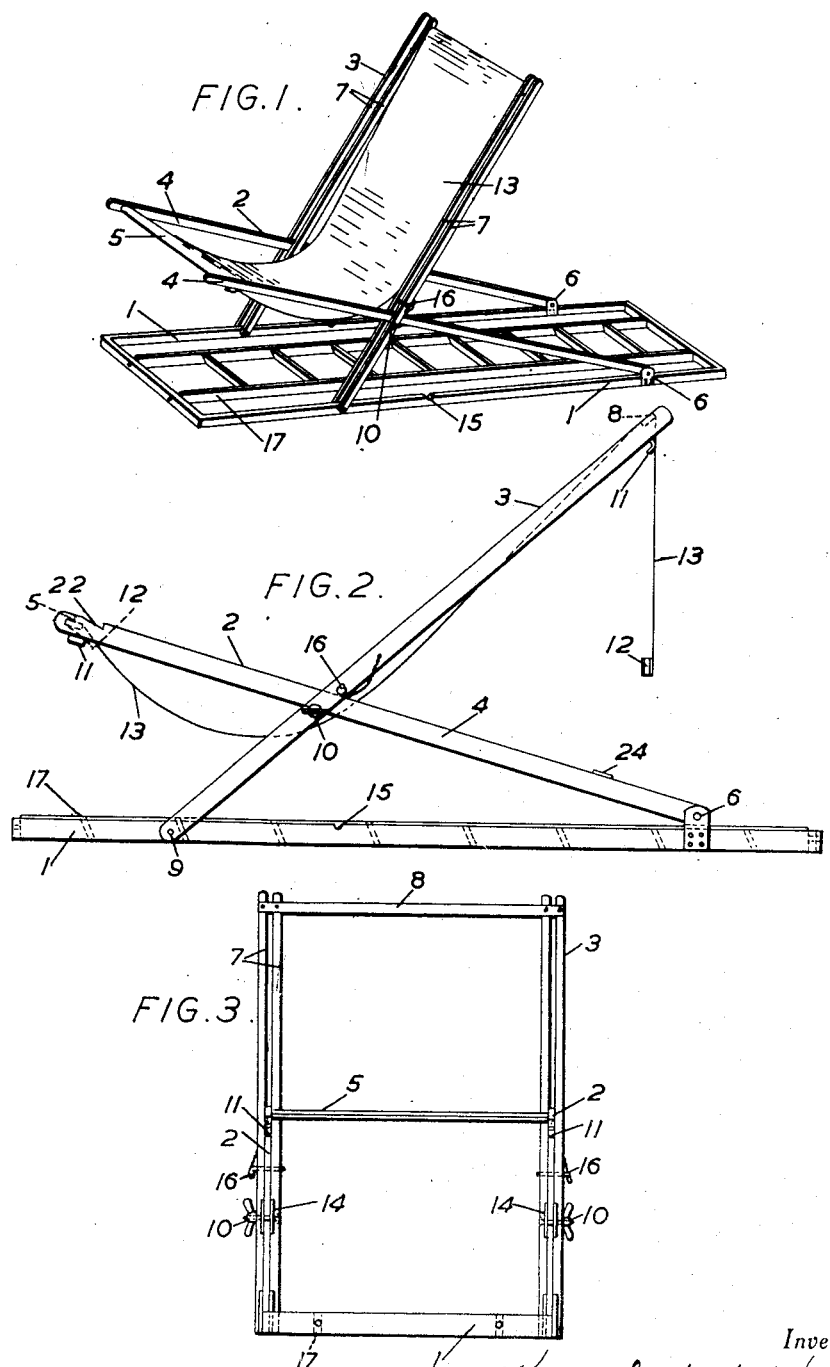

Inventor
Kenneth W. W. High
By
Cushman, Darby & Cushman
Attorneys

Patented Jan. 5, 1954

2,664,940

UNITED STATES PATENT OFFICE 2,664,940

CONVERTIBLE, ADJUSTABLE, AND COLLAPSIBLE SEAT AND LADDER

Kenneth Walter Warren High, Haworth, Keighley, England

Application June 15, 1951, Serial No. 231,802

6 Claims. (Cl. 155—42)

1

This invention relates to adjustable and collapsible supporting frames for seats and like articles of furniture and more particularly to adjustable and collapsible frames for supporting hammock seats in an assembly of the type commonly known as a deck chair.

According to the invention the adjustable and collapsible supporting frame comprises an oblong base board or framework to the longer sides of which two inverted U-shaped frames are pivotally connected to form an X-frame, one U-frame having two single arms pivotally connected by one end of each arm at opposite points adjacent one end of the base board or framework, whilst the other U-frame has two double arms similarly connected adjacent the other end of the base board or framework, the single arms of the first U-frame being slidable within the double arm of the other U-frame, and said double arms having adjustable clamping bolts or brackets adapted to engage and support the single arms and/or clamp the double and single arms together.

The adjustable clamping bolts or brackets may be removable from the double arms to permit of the U-frames folding flat upon the base board or framework, or the latter may have recesses to accommodate such bolts or brackets.

A bracket may be provided adjacent the upper end of each arm of both U-shaped frames, whereby cross members which carry a hammock or like seat may be detachably secured to the supporting frame by engaging their ends in the brackets.

The ends of the cross-members and the portions of the brackets engaged by them will be preferably so correspondingly shaped as to prevent rotation of the cross-members when engaged in the brackets.

One embodiment of the invention is illustrated in the accompanying drawings, wherein:

Figure 1 is a perspective view of the supporting frame in use as a deck chair.

Figure 2 is a side elevation thereof with one end of the canvas seat detached.

Figure 3 is a front elevation with the canvas seat removed.

Figure 4:
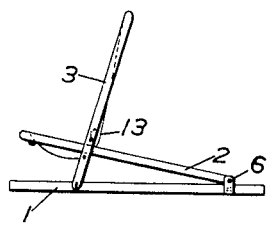
Figures 4 to 18 show different positions of the supporting frame when used for various purposes.

Referring to Figures 1 to 3 of the drawings, the adjustable and collapsible supporting frame comprises a main ground-contacting framework 1 of oblong shape, which may be constructed of wooden or metal spars. Two U-shaped frames 2, 3 of similar material are pivotally connected to the spars forming the longer sides of the base

2 framework 1, to form an X-frame which can be collapsed downwardly upon the base framework for ease of transport, or can be made to stand firmly erected to act as a supporting frame for a hammock seat or the like. One U-frame 2 consists of two single opposed arms 4 connected together at or adjacent one end of each arm by an integral or attached spar 5 to form the U-frame whilst the other ends of the arms are pivotally connected at opposite points adjacent one end of the base framework 1 to brackets 6 mounted thereon, the arrangement being such that this U-frame 2 can pivot or fold down upon the base framework with the arms of the U-frame directly above the longer side of the base framework.

The other U-frame 3 consists of two double arms 7 similarly connected together at one end by an integral or attached spar 8. Each double arm 7 consists of two spaced collateral spars, pivotally secured one upon each side of a side member of the base framework and the two composite arms being attached at opposite points adjacent the opposite end of the base framework to that at which the other U-frame is connected by means of axis pins or bolts 9 which pass through both the double arm and the base framework. In order to form the X-frame, the single arms of the one U-frame 2 pass within and are slidable within the double arms of the other U-frame 3, whilst two clamping bolts 10 are provided one upon each double arm 7, having wing nuts or the like as may be conveniently tightened or slackened by hand. These clamping bolts pass through both spars of the double arms and thus can directly support the single arms, or alternatively by tightening these bolts to draw the spars together, the double arms may be caused to grip the single arms in any desired relative position thereof.

With the supporting frame thus erected, a deck chair is formed by slinging the usual type of canvas seat from the spars which connect the arms of the U-frames, but it is preferred that this canvas seat should be detachable and also adjustable as regards its length when attached to the U-frames in order to give the widest possible range of adjustment of the frame and for this purpose brackets 11 are provided at or near the upper end of the arms of the U-frames on the undersides of the arms. These brackets are adapted to slidably receive the ends of further spars or cross-members 12 to which the ends of the canvas seat 13 are attached and the ends of said spars 12 are of rectangular cross-section whilst the portions of the brackets 11 which these ends engage will also be correspondingly shaped, thus preventing any tendency for the spars to rotate when in use. In order to adjust the length of the canvas seat when desired or necessary it is a simple matter to release either spar from its bracket and take up or unwind some of the canvas seat length and then replace the spar in its brackets.

The deck chair thus provided can be readily adjusted to many positions over a wide range to suit the requirement of an occupant, by virtue of the adjustability of the supporting frame and the canvas seat.

The double arm 7 of the U-frame 3 can be provided with canvas or other roughened portions 14 (see Figure 3) by which a good grip is ensured when the clamping bolts 10 are tightened, and the sides of the base framework 1 can have recesses 15 to accommodate such bolts when the frame is folded flat.

Removable pins 16 are shown capable of being inserted through holes in the double arms 7 to act as a safety stop and limit the relative movement of the two U-frames when desired.

The base framework 1 is shown as incorporating a ladder 17 having end pegs capable of engaging in holes in the end spars of the framework, such ladder being removable for separate use or usable when held in the framework as will be hereafter described. In Figure 2 of the drawings the ladder 17 is shown to be of shorter length that the internal dimension of the base framework 1 so that moving the ladder 17 towards the right causes the pegs attached to the ladder at the left to be withdrawn from the end spar of the framework and this end of the ladder can be lifted after which the right hand end can then be withdrawn.

Figure 5:
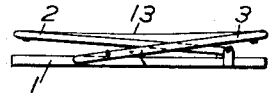
Figure 6:
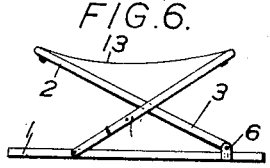
Figure 7:
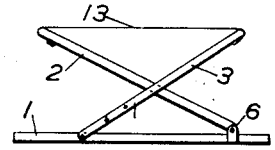
Figure 8:
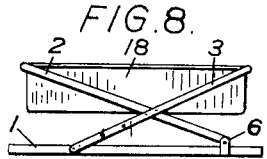
Figure 9:
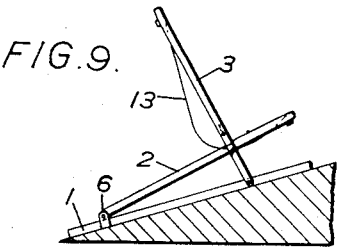
Figure 10:
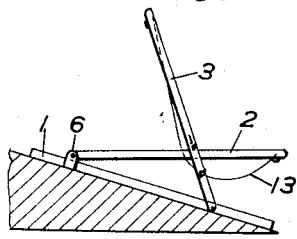
Figure 11:
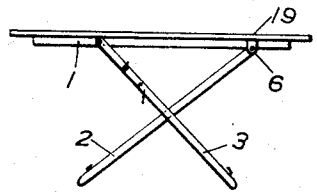
Figure 12:
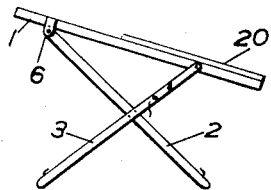
Figure 13:
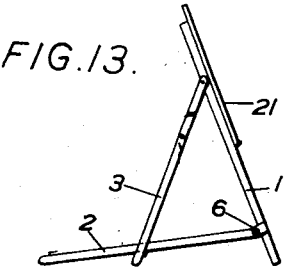

Referring now to Figures 4 to 18 of the drawings, Figure 4 shows the frame used as an upright chair, Figure 5 shows the frame and canvas adjusted and clamped to provide a recumbent position, or with the canvas stretched taut to form a camp bed. Figures 6 and 7 show the canvas shortened and the frame raised to any desired height to provide a camp stool, the canvas being taut in Figure 7 to prevent the frame from collapsing apart from the use of the clamps 10. Figure 8 shows a baby's crib 18 supported on the frame instead of the canvas 13, a rocking motion being permissible if the clamps 10 are left slack. Figures 9 and 10 show the frame with canvas used as a chair, the frame being adjusted to provide a safe and normal seating position facing either up or down quite a steep slope. Figure 11 shows the frame reversed so that the arms act as legs and the base can support a plank or board 19 to provide a table of any desired height. Figure 12 shows the frame adjusted to provide a support for drawing or writing table with its surface 20 at any desired inclination. Figure 13 shows the frame up-ended and a blackboard 21 resting on pegs inserted into holes in the underside of the base 1, or in this position it can be used as an artist's easel.

Figure 14:
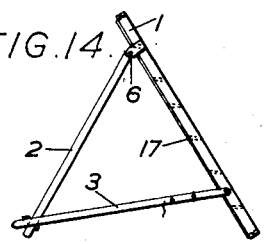
Figure 15:
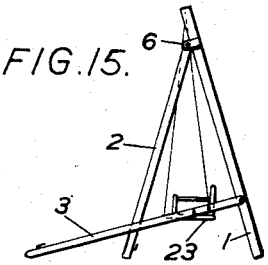
Figure 16:
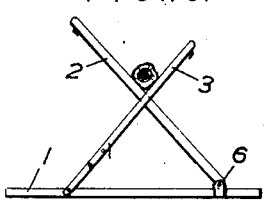

Figure 14 shows the use of the frame as a stepladder, the ladder 17 being in position in the base 1 and the spar 8 on the arms 3 engaging with notches 22 (see Figure 2) on the arms 2 to hold the ladder steady. In Figure 15 the frame is shown in use as a support for a swing, a seat or chair 23 being slung from the upper end member of the upturned base 1 by eyebolts or otherwise. Figure 16 shows how the frame resting on its base 1 can be used as a saw block for sawing small logs and the like, the arms 2, 3 being held at the required height by the clamps 10.

Figure 17:
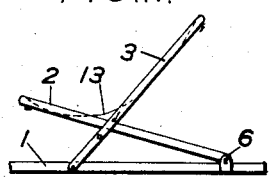
Figure 18:
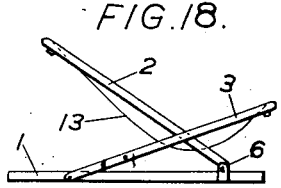

Figure 17 shows the frame with canvas in normal use as a chair, the frame 2 forming the leg rest. Figure 18 shows the position reversed with the frame 3 forming the leg rest, by which a rocking chair is provided having the same range of adjustment but still affording complete support to the whole body. To limit the downward movement of the leg support 3 in this case turnbutton stops 24 on the sides of the frame 2 (see Figure 2) can be turned at right-angles across the path of the arms of the frame 3.

I claim:

1. An adjustable and collapsible supporting frame for seats and other articles of furniture, comprising in combination an oblong base, a U-shaped frame having each of its arms formed by two spaced members with the ends of the arms at the open end of the frame pivotally connected at opposite points to the sides of said base adjacent one end thereof, a second U-shaped frame having single arms arranged slidably through said double arms said single arms having their ends pivotally connected at opposite points to the sides of said base adjacent the other end thereof, and an adjustable clamping device associated with each said double arm for clamping said single arms within said double arms to form an X-shaped frame.

2. An adjustable and collapsible supporting frame for seats and other articles of furniture, comprising in combination an oblong base, a U-shaped frame having each of its arms formed by two spaced members with the ends of the arms at the open end of the frame pivotally connected at opposite points to the sides of said base adjacent one end thereof, a second U-shaped frame having single arms arranged slidably through said double arms said single arms having their ends pivotally connected at opposite points to the sides of said base adjacent the other end thereof, and an adjustable clamping device passing through both members of each said double arm for supporting said single arms and of clamping said single arms within said double arms to form an X-shaped frame.

3. An adjustable and collapsible supporting frame for seats and other articles of furniture, comprising in combination an oblong base, a U-shaped frame having each of its arms formed by two spaced members with the ends of the arms at the open end of the frame pivotally connected at opposite points to the sides of said base adjacent one end thereof, a second U-shaped frame having single arms arranged slidably through said double arms said single arms having their ends pivotally connected at opposite points to the sides of said base adjacent the other end thereof and an adjustable clamping device passing through both members of each said double arm for supporting said single arms and of clamping said single arms within said double arms to form an X-shaped frame, the pivotal connections for the two U-shaped frames being constructed to allow said frames to be collapsed into a practically flat position upon the base.

4. A combination as claimed in claim 1 including an angle bracket on each arm of both U-shaped frames adjacent the closed ends thereof to receive removably and prevent rotation of two cross members carrying the ends of a flexible seat.

5. A combination as claimed in claim 1, wherein said oblong base consists of a rectangular frame with a central longitudinal portion forming a ladder capable of use as such when the X-shaped frame is collapsed and also as a stepladder when said X-shaped frame is clamped in open position and used to support the ladder.

6. An adjustable and collapsible supporting frame for a canvas and like flexible seat comprising in combination an oblong base, a U-shaped frame having each of the its arms formed by two parallel spaced members with the open ends of such double arms pivotally connected at opposite points to the sides of said base adjacent one end thereof, a second U-shaped frame having single arms arranged slidably through said double arms, said single arms having their ends pivotally connected at opposite points to the sides of said base adjacent the other end thereof, the pivotal connections being constructed to allow said U-shaped frames to be collapsed into a practically flat position upon the base, a screw threaded spindle passing through both members of each said double arm so as to be capable of supporting said single arms and having a tightening handle capable of clamping said single arms between roughened inner faces on said double arms to form an X-shaped frame, removable pins inserted through holes in said double arms adjacent said clamping screws capable of preventing collapsing of said X-shaped frame, and an angle bracket on the underside of each arm of both U-shaped frames adjacent the closed ends thereof receiving removably and preventing rotation of two cross members.

KENNETH WALTER WARREN HIGH.

References Cited in the file of this patent
UNITED STATES PATENTS

| Number | Name | Date |
|---|---|---|
| 821,055 | Ordway | May 22, 1906 |
| 1,673,387 | Bergmann | June 12, 1928 |
| 1,945,580 | Turnai | Feb. 6, 1934 |
| 2,242,081 | Long | May 13, 1941 |